US011955806B2

(12) United States Patent
Potucek

(10) Patent No.: US 11,955,806 B2
(45) Date of Patent: Apr. 9, 2024

(54) INDUCTIVE POWER COUPLINGS FOR POOL AND SPA EQUIPMENT

(71) Applicant: Hayward Industries, Inc., Berkeley Heights, NJ (US)

(72) Inventor: Kevin L. Potucek, Naples, FL (US)

(73) Assignee: Hayward Industries, Inc., Charlotte, NC (US)

( * ) Notice: Subject to any disclaimer, the term of this patent is extended or adjusted under 35 U.S.C. 154(b) by 0 days.

(21) Appl. No.: 17/254,085

(22) PCT Filed: Jun. 20, 2019

(86) PCT No.: PCT/US2019/038121
§ 371 (c)(1),
(2) Date: Dec. 18, 2020

(87) PCT Pub. No.: WO2019/246336
PCT Pub. Date: Dec. 26, 2019

(65) Prior Publication Data
US 2021/0265865 A1  Aug. 26, 2021

Related U.S. Application Data

(60) Provisional application No. 62/687,511, filed on Jun. 20, 2018.

(51) Int. Cl.
*H02J 50/00* (2016.01)
*E04H 4/16* (2006.01)
(Continued)

(52) U.S. Cl.
CPC .............. *H02J 50/10* (2016.02); *E04H 4/1654* (2013.01); *H01F 38/14* (2013.01); *H02J 7/35* (2013.01); *H02S 99/00* (2013.01)

(58) Field of Classification Search
CPC .............. H02J 50/00; H02J 50/10; H04B 5/00
See application file for complete search history.

(56) References Cited

U.S. PATENT DOCUMENTS 2,788,992 A  *  4/1957  De Vienne ........... H02G 3/0616
285/356
3,549,990 A    12/1970  Hochheiser
(Continued)

FOREIGN PATENT DOCUMENTS

CN  101725263 A  6/2010
EP  1122382 A1  8/2001
(Continued)

OTHER PUBLICATIONS

International Search Report and Written Opinion of the International Searching Authority, dated Sep. 18, 2019, issued in connection with International Appln. No. PCT/US2019/038121 (9 pages).
(Continued)

*Primary Examiner* — Adi Amrany
(74) *Attorney, Agent, or Firm* — McCarter & English, LLP

(57) ABSTRACT

A swivel component allows a power cable to a pool or spa component, to swivel when the inductive power couplings are coupled. The couplings include a first inductive coupling that can be positioned within and/or mounted into a wall fitting, a second inductive coupling that inductively couples with the first inductive coupling, a swivel component attached to the second inductive coupling for allowing the second coupling to swivel with respect to the first inductive coupling, and a retainer ring that engages with the wall fitting and retains the first and second couplings and the swivel component in position within the wall fitting. A power cable is connected at one end to the second inductive power coupling and at an opposite end to a pool or spa component, such as an electric cleaner. Swiveling of the
(Continued)

second power coupling relative to the first power coupling reduces kinking of the power cable.

10 Claims, 19 Drawing Sheets

(51) Int. Cl.
    *H01F 38/14*     (2006.01)
    *H02J 7/35*     (2006.01)
    *H02J 50/10*     (2016.01)
    *H02S 99/00*     (2014.01)

(56) References Cited

U.S. PATENT DOCUMENTS

| | | | |
|---|---|---|---|
| 3,995,209 | A | 11/1976 | Weston |
| 4,404,559 | A | 9/1983 | Renner |
| 4,654,573 | A | 3/1987 | Rough et al. |
| 4,717,078 | A * | 1/1988 | Arp .................. B05B 15/68 285/271 |
| 4,838,797 | A | 6/1989 | Dodier |
| 5,106,492 | A | 4/1992 | Distinti et al. |
| 5,422,519 | A | 6/1995 | Russell |
| 5,455,467 | A | 10/1995 | Young et al. |
| 6,037,740 | A | 3/2000 | Pollock et al. |
| 6,160,374 | A | 12/2000 | Hayes et al. |
| 6,294,084 | B1 | 9/2001 | Henkin et al. |
| 6,485,638 | B2 | 11/2002 | Henkin et al. |
| 6,652,742 | B2 | 11/2003 | Henkin et al. |
| 6,842,931 | B2 | 1/2005 | Porat et al. |
| 7,101,475 | B1 | 9/2006 | Maaske et al. |
| 8,250,682 | B2 * | 8/2012 | Mjelde .................. E04H 4/169 285/221 |
| 9,300,101 | B2 | 3/2016 | Hayes et al. |
| 9,453,376 | B1 * | 9/2016 | Raymond ............... E21B 17/20 |
| 9,502,907 | B2 * | 11/2016 | Potucek ................. H02J 7/025 |
| 10,381,872 | B2 | 8/2019 | Potucek et al. |
| 10,389,166 | B1 | 8/2019 | Sahoo et al. |
| 10,574,079 | B1 | 2/2020 | Berkowitz et al. |
| 10,693,385 | B2 | 6/2020 | Mao |
| 10,985,612 | B2 | 4/2021 | Potucek et al. |
| 2001/0032809 | A1 | 10/2001 | Henkin et al. |
| 2004/0092181 | A1 | 5/2004 | Porat |
| 2004/0168299 | A1 | 9/2004 | Porat et al. |
| 2005/0050627 | A1 * | 3/2005 | Ayeni ................. A61H 33/6063 4/541.6 |
| 2005/0234595 | A1 | 10/2005 | Tani |
| 2005/0253555 | A1 | 11/2005 | Lee et al. |
| 2006/0101567 | A1 | 5/2006 | Hutchings |
| 2007/0032809 | A1 | 2/2007 | Griego et al. |
| 2007/0067930 | A1 | 3/2007 | Garti |
| 2007/0151914 | A1 | 7/2007 | Riley |
| 2007/0247838 | A1 | 10/2007 | Fan |
| 2008/0060984 | A1 | 3/2008 | Henkin et al. |
| 2008/0216877 | A1 * | 9/2008 | Lawson ................ E04H 4/0025 4/490 |
| 2009/0064403 | A1 | 3/2009 | Wolfe |
| 2010/0252560 | A1 | 10/2010 | Churchill |
| 2011/0247970 | A1 | 10/2011 | Evingham |
| 2013/0049674 | A1 | 2/2013 | Davis |
| 2013/0300204 | A1 | 11/2013 | Partovi |
| 2013/0321223 | A1 | 12/2013 | Bokenfohr et al. |
| 2014/0007339 | A1 * | 1/2014 | Hodak .................. E04H 4/1272 4/507 |
| 2017/0073991 | A1 | 3/2017 | Potucek et al. |
| 2017/0307964 | A1 | 10/2017 | Okamoto et al. |
| 2018/0142487 | A1 | 5/2018 | Durvasula et al. |
| 2018/0155947 | A1 | 6/2018 | Hayes et al. |
| 2019/0097447 | A1 | 3/2019 | Partovi |
| 2019/0363579 | A1 | 11/2019 | Potucek et al. |

FOREIGN PATENT DOCUMENTS

| | | |
|---|---|---|
| EP | 1454885 A2 | 9/2004 |
| EP | 1147758 B1 | 1/2006 |
| EP | 1657798 A1 | 5/2006 |
| EP | 1760564 A2 | 3/2007 |
| EP | 1785552 A2 | 5/2007 |
| EP | 2551425 A1 | 1/2013 |
| FR | 2998104 A1 | 5/2014 |
| WO | 2009/047768 A2 | 4/2009 |
| WO | 2019/246336 A1 | 12/2019 |

OTHER PUBLICATIONS

International Search Report dated Jun. 4, 2012, issued in connection with Int'l Application No. PCT/US2011/064248 (5 pages).
Written Opinion dated Jun. 4, 2012, issued in connection with Int'l Application No. PCT/US2011/064248 (10 pages).
Office Action (Restriction Requirement) dated Feb. 11, 2014, issued in connection with U.S. Appl. No. 13/316,161 (4 pages).
Office Action dated Aug. 12, 2014, issued in connection with U.S. Appl. No. 13/316,161 (13 pages).
Interview Summary dated Jan. 9, 2015, issued in connection with U.S. Appl. No. 13/316,161 (3 pages).
Chinese Office Action dated Feb. 17, 2015, issued in connection with Chinese Application No. 201180066389.4 (7 pages, including English-language translation).
Office Action dated Jun. 17, 2015, issued in connection with U.S. Appl. No. 13/316,161 (16 pages).
Partial Supplementary European Search Report dated Jun. 18, 2015, issued in connection with European Patent Application No. 11847650.6 (6 pages).
Extended Supplementary European Search Report dated Sep. 28, 2015, issued in connection with European Patent Application No. 11847650.6 (11 pages).
Chinese Office Action dated Dec. 28, 2015, issued in connection with Chinese Application No. 201180066389.4 (13 pages, including English-language translation).
First Examination Report dated Mar. 3, 2016, issued in connection with Australian Patent Application No. 2011338154 (3 pages).
Notice of Allowance dated Apr. 21, 2016, issued in connection with U.S. Appl. No. 13/316,161 (6 pages).
Notice of Allowance dated Jul. 13, 2016, issued in connection with U.S. Appl No. 13/316,161 (6 pages).
Examination Report dated Jul. 19, 2016, issued in connection with European Patent Application No. 11847650.6 (5 pages).
Office Action dated Jul. 27, 2016, issued in connection with Israeli Patent Application No. 226860 (5 pages, including English-language translation).
Examination Report dated Jun. 16, 2017, issued in connection with European Patent Application No. 11847650.6 (3 pages).
Office Action dated Jul. 6, 2017, issued in connection with Canadian Patent Application No. 2,820,961 (3 pages).
Examination Report dated Aug. 3, 2017, issued in connection with Australian Patent Application No. 2016225912 (3 pages).
Office Action dated Nov. 8, 2017, issued in connection with U.S. Appl. No. 15/359,016 (13 pages).
Examination Report dated Mar. 21, 2018, issued in connection with European Patent Application No. 11847650.6 (3 pages).
Office Action dated Jun. 26, 2018, issued in connection with Chinese Application No. 201610844282.2, and English translation thereof (18 pages).
Office Action dated Aug. 21, 2018, issued in connection with U.S. Appl. No. 15/359,016 (14 pages).
Office Action dated Aug. 24, 2018, issued in connection with Canadian Patent Application No. 2,820,961 (6 pages).
Office Action dated Sep. 28, 2018, issued in connection with U.S. Appl. No. 15/359,046 (10 pages).
Communication under Rule 71(3) EPC (Intention to Grant) dated Feb. 4, 2019, issued in connection with European Patent Application No. 11847650.6 (5 pages).

(56) References Cited

OTHER PUBLICATIONS

Office Action dated Feb. 21, 2019, issued in connection with Israeli Patent Application No. 254175 (8 pages, including English-language translation).
Notice of Allowance, including Examiner-Initiated Interview Summary, dated Apr. 25, 2019, issued in connection with U.S. Appl. No. 15/359,016 (13 pages).
Office Action dated May 8, 2019, issued in connection with Chinese Application No. 201610844282.2, and English translation thereof (15 pages).
Office Action dated May 16, 2019, issued in connection with Canadian Patent Application No. 2,820,961 (4 pages).
Examination Report dated Jun. 22, 2019, issued in connection with Australian Patent Application No. 2018211302 (3 pages).
Extended European Search Report dated Nov. 4, 2019, issued in connection with European Patent Application No. 19191326.8 (9 pages).
Office Action dated Jan. 17, 2020, issued in connection with Chinese Application No. 201610844282.2, and English translation thereof (14 pages).
Office Action dated Mar. 13, 2020, issued in connection with U.S. Appl. No. 16/538,522 (7 pages).
Decision of Rejection dated Jul. 29, 2020, issued in connection with Chinese Application No. 201610844282.2, and machine-generated translation thereof (17 pages).
Office Action dated Oct. 13, 2020, issued in connection with Israeli Patent Application No. 254175 (6 pages, including English-language translation).
Notice of Allowance dated Dec. 15, 2020, issued in connection with U.S. Appl. No. 17/020,488 (9 pages).
Examination Report dated Feb. 10, 2021, issued in connection with Australian Patent Application No. 2020202030 (8 pages).
Examination Report dated Feb. 22, 2021, issued in connection with European Patent Application No. 19191326.8 (3 pages).
PCT Invitation to Pay Additional Fees dated Aug. 24, 2021, issued in connection with International Application No. PCT/US2021/038300 (2 pages).
International Search Report and Written Opinion of the International Searching Authority dated Nov. 26, 2021, issued in connection with International Application No. PCT/US2021/038300 (10 pages).
Office Action dated Dec. 22, 2021, issued in connection with Israeli Patent Application No. 282409 (10 pages, including English-language translation).
Notification of Reexamination dated Jan. 29, 2022, issued in connection with Chinese Patent Application No. 201610844282.2 (13 pages, including English-language translation).
Extended European Search Report dated Feb. 18, 2022, issued in connection with European Patent Application No. 19821893.5 (11 pages).
Office Action (Restriction Requirement) dated Mar. 21, 2022, issued in connection with U.S. Appl. No. 17/353,615 (9 pages).
Examination Report dated Apr. 13, 2022, issued in connection with European Patent Application No. 19191326.8 (5 pages).
Office Action dated Jun. 16, 2022, issued in connection with U.S. Appl. No. 17/235,380 (7 pages).
Office Action dated Jul. 1, 2022, issued in connection with U.S. Appl. No. 17/353,615 (12 pages).
Decision on Reexamination dated Jul. 13, 2022, issued in connection with Chinese Application No. 201610844282.2 (23 pages, including English-language translation).
Office Action dated Dec. 8, 2022, issued in connection with U.S. Appl. No. 17/353,615 (12 pages).
Office Action dated Mar. 6, 2023, issued in connection with U.S. Appl. No. 17/235,380 (7 pages).
Examination Report dated Oct. 5, 2023, issued in connection with European Patent Application No. 19191326.8 (5 pages).
Office Action dated May 24, 2023, issued in connection with U.S. Appl. No. 17/353,615 (15 pages).
Notice of Allowance dated Jun. 28, 2023, issued in connection with U.S. Appl. No. 17/235,380 (7 pages).
Office Action dated Dec. 10, 2023, issued in connection with Israeli Patent Application No. 279477 (4 pages).
Examination Report dated Dec. 14, 2023, issued in connection with Australian Patent Application No. 2019288453 (4 pages).

\* cited by examiner

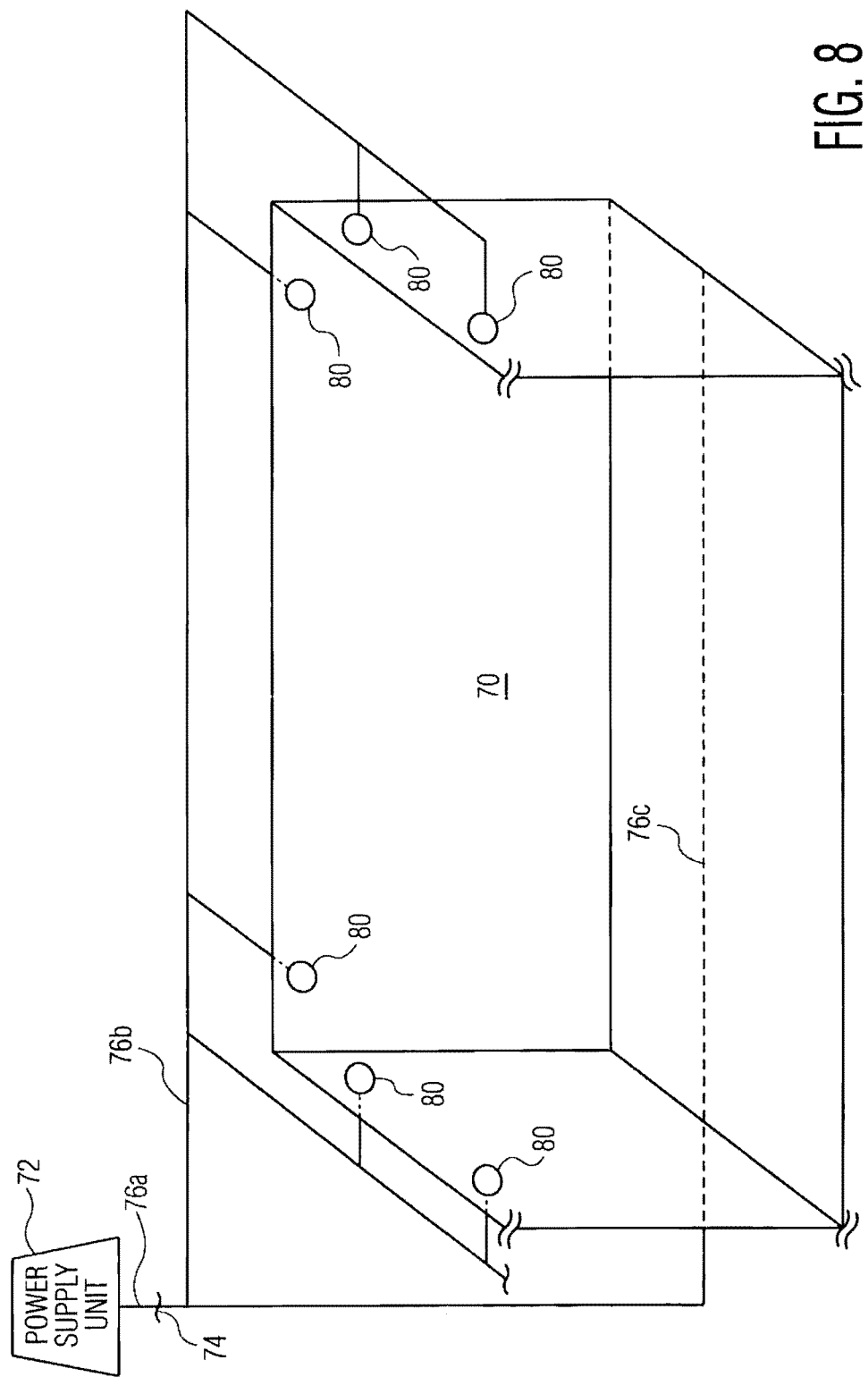

INDUCTIVE POWER COUPLINGS FOR POOL AND SPA EQUIPMENT

RELATED APPLICATIONS

The present application is a U.S. National Phase Application under 35 U.S.C. § 371 of International Application No. PCT/US2019/038121 filed on Jun. 20, 2019, which claims the benefit of priority to U.S. Provisional Patent Application Ser. No. 62/687,511, filed on Jun. 20, 2018, the entire disclosures of which are hereby incorporated by reference.

BACKGROUND OF THE INVENTION

Field of the Invention

The present invention relates to power supplies, and specifically, power supplies for pool and spa equipment.

Related Art

Various types of equipment are available for pools and spas. Often, such equipment is powered electrically. One example is a pool cleaner, which automatically cleans the underwater surfaces of a pool or spa. Such a device can be powered hydraulically (e.g., by a hose connected to the return line of a pool or spa filter and pump), or electrically. Also, such a device can float to the surface of pool/spa water, for cleaning same.

In the case of an electrically-powered underwater pool cleaner, electrical power is delivered to the cleaner by a low-voltage cable connected between the pool cleaner and a power supply external to the pool or spa. Because the power supply is located external to the pool or spa, it is necessary for the cable connecting the pool cleaner and the power supply to extend out of the pool and, often, across a peripheral concrete walkway surrounding most pools. This can be unsightly.

Self-contained, battery-powered, underwater pool cleaners do exist, and obviate the need for an external power supply and a cable interconnecting the pool cleaner with an external power supply. However, only a limited amount of power is available to the pool cleaner, due to the limited capacity of the cleaner's on-board battery. As a result, the pool cleaner must be periodically recharged, which often requires removing the pool cleaner from the pool before each recharging.

SUMMARY OF THE INVENTION

The present invention relates to power supplies for pool and spa equipment. In one embodiment, the power supply includes a buoyant housing, a peripheral float, at least one photovoltaic (solar) cell positioned on the buoyant housing for collecting sunlight and converting same to electrical energy, and a power cable for interconnecting the power supply and pool/spa equipment (e.g., an underwater pool cleaner) and for transmitting electrical energy generated by the solar cells to the equipment to power same. Optionally, the power supply could include one or more rechargeable batteries for storing electrical energy generated by the solar cells and powering the pool/spa equipment during periods of low or no sunlight.

In another embodiment, the present invention provides inductive power couplings positioned in the walls or floor of a pool or spa, for providing power to an underwater device (such as an underwater cleaner). The inductive power coupling in the wall or floor includes an inductor circuit powered by an associated power supply unit. An underwater device (e.g., a pool cleaner) could be connected to a complementary inductive power coupling which includes an inductor circuit. The complementary inductive power coupling of the underwater device can be inserted into the inductive power coupling of the pool/spa. Mating of the inductive power couplings allows energy to be wirelessly transferred from the first inductor circuit to the second inductor circuit through an electromagnetic field, to supply the underwater device with electrical power. Optionally, the inductive power couplings could be shaped as flat couplings, and/or they could include magnets located on the peripheries of the couplings for magnetically coupling the components.

In another embodiment, the present invention provides an inductive element, e.g., conduit or cable, which could be buried within a pool or spa floor or wall. This creates an electromagnetic field surrounding the inductive element, for wirelessly transmitting energy to an inductive circuit onboard an underwater device (e.g., to an underwater cleaner operated along the pool or spa floor or wall).

In another embodiment, the present invention provides inductive power couplings that can be installed in an existing plumbing fixture of a pool or a spa, for providing power to a pool or spa device (such as a cleaner). For example, the power coupling can be installed (retrofitted) into an existing suction outlet (and associated pipe) in a pool or a spa, to provide electrical power via such an outlet. An underwater device (e.g., a pool cleaner) could be connected to a complementary inductive power coupling which includes an inductor circuit. The complementary inductive power coupling of the underwater device can be inserted into the suction outlet and coupled with the inductive power coupling installed in the suction outlet.

In still another embodiment, the present invention provides inductive power couplings having a swivel feature that allows a power cable to a pool or spa component, such as an electric pool cleaner, to swivel when the inductive power couplings are coupled together. In this embodiment, the couplings include a first inductive coupling that can be positioned and/or mounted into a wall fitting in the wall of a pool or spa, a second inductive coupling that inductively couples with the first inductive coupling, a swivel component attached to the second inductive coupling for allowing the second coupling to swivel with respect to the first inductive coupling, and a retainer ring that engages with the wall fitting and retains the first and second couplings and the swivel component in position within the wall fitting. A power cable is connected at one end to the second inductive power coupling and at an opposite end to a pool or spa component, such as an electric cleaner. Swiveling of the second power coupling relative to the first power coupling reduces kinking, tangling and/or bunching of the power cable when the electric cleaner is in operation.

BRIEF DESCRIPTION OF THE DRAWINGS

The foregoing features of the invention will be apparent from the following Detailed Description of the Invention, taken in connection with the accompanying drawings, in which:

FIG. 8 is a perspective diagram showing inductive power couplings of the present invention connected to a power supply unit;

DETAILED DESCRIPTION OF THE INVENTION

The present invention relates to power supplies for pool and spa equipment, as discussed in detail below in connection with FIGS. 1-18.

Figure 1:
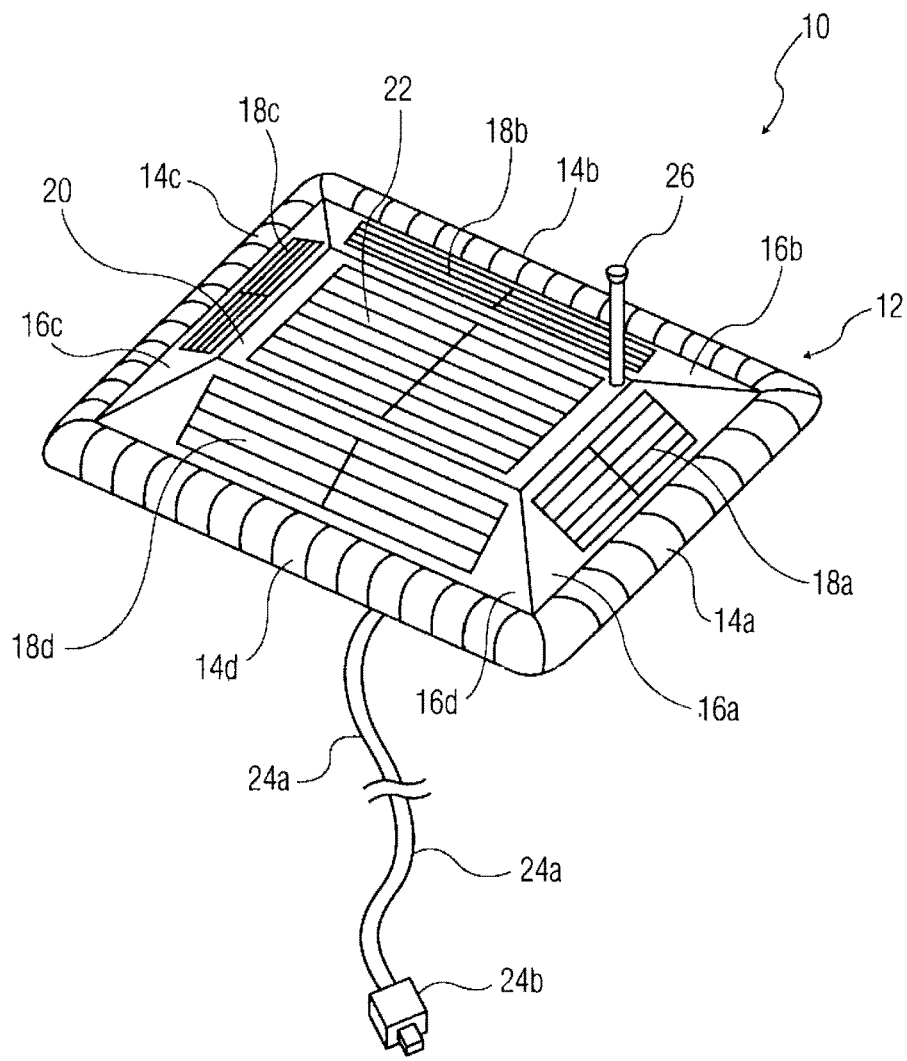
FIGS. 1-2 are perspective and top views, respectively, of the floating power supply of the present invention.
Figure 2:
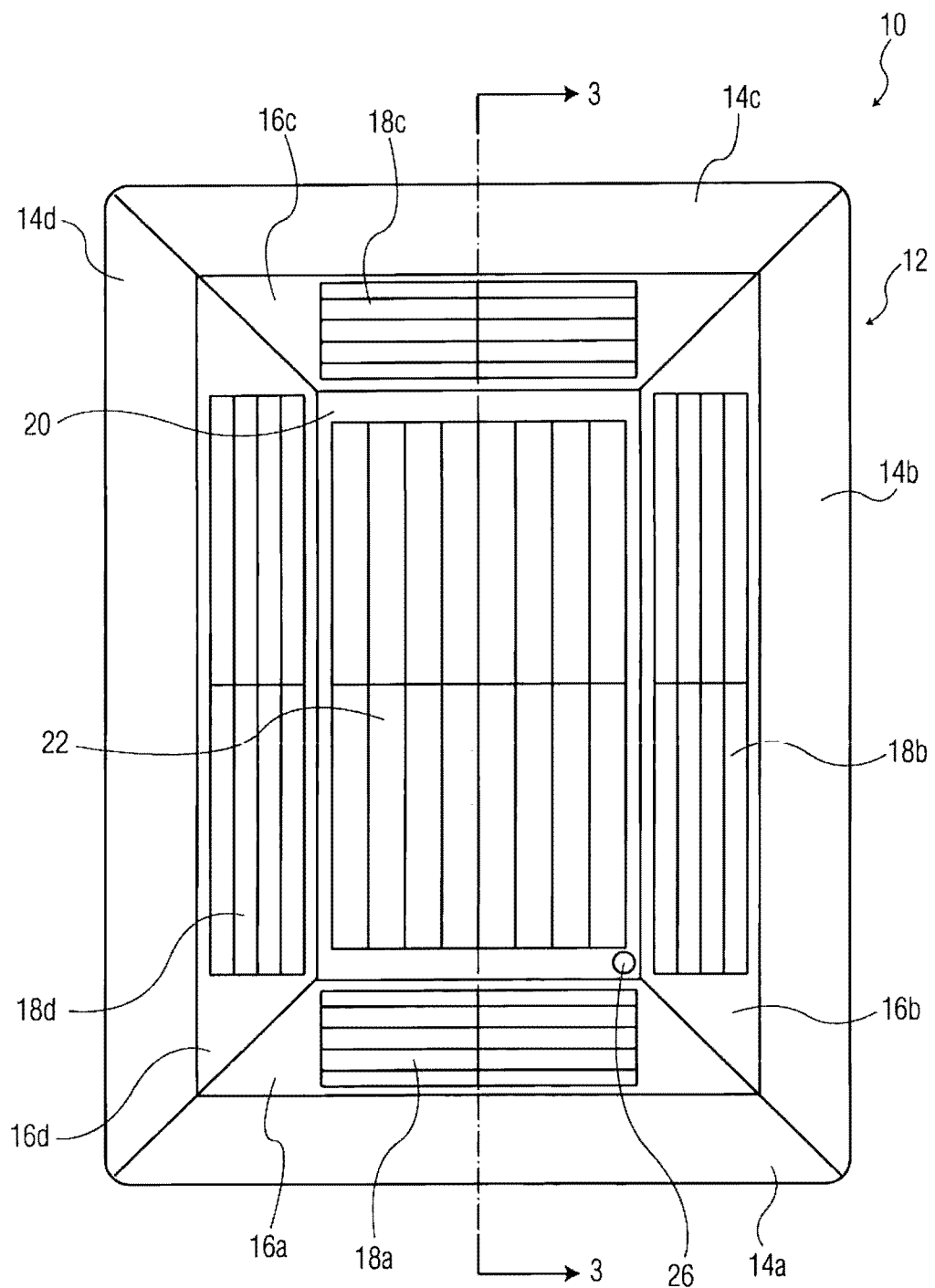

FIGS. 1-2 are perspective and top views, respectively, of the floating power supply 10 of the present invention. The power supply 10 includes a buoyant housing 12, a power cord 24a connected to the buoyant housing 12, an optional radio frequency antenna 26 for allowing wireless communication with a device connected to the power supply 10, and a coupling 24b for connection with pool or spa equipment, such as an underwater pool cleaner. The buoyant housing 12 includes peripheral float sections 14a-14d, angled walls 16a-16d, angled photovoltaic (solar) cells 18a-18d on the angled surfaces 16a-16d, and a top wall 20 containing a top solar cell 22. The housing 12 is waterproof, floats in pool or spa water, and generates electrical power from sunlight for powering pool or spa equipment connected to the coupling 24b. The cord 24a delivers such power from the buoyant housing 12 to the pool or spa equipment. The antenna 26 could allow for wireless communication with a handheld device and/or central pool/spa control system, as well as a home LAN, while avoiding issues related to transmitting radio frequencies underwater. Advantageously, the solar cells 18a-18d and 22 are positioned so as to maximize exposure to sunlight when the housing 12 is floating in a pool or spa. It is noted that the shape of the housing 12 could be varied, as well as the number and positioning of the solar cells 18a-18d and 22, without departing from the spirit or scope of the present invention.

Figure 3:
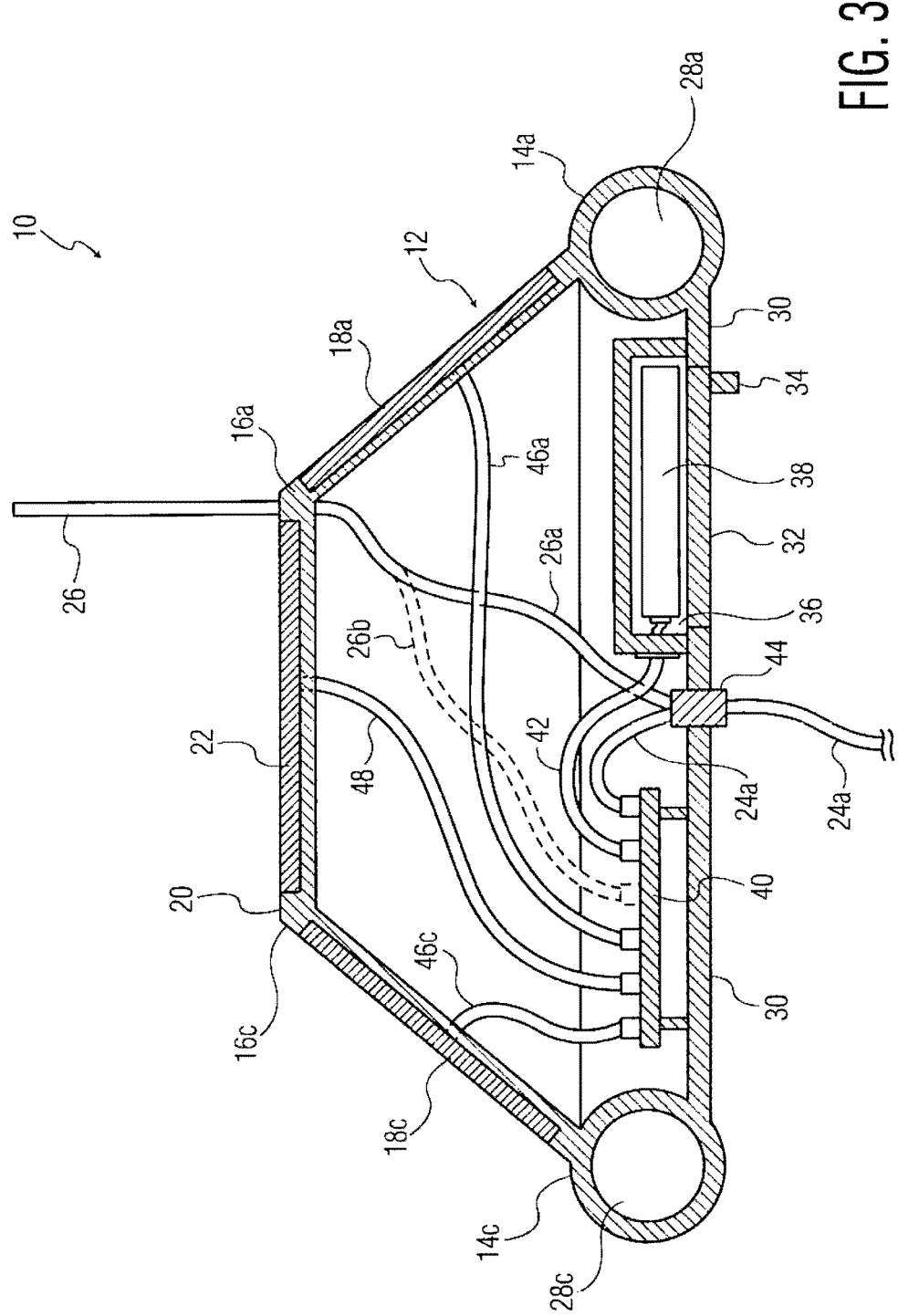
FIG. 3 is a cross-sectional view taken along the line 3-3 of FIG. 2, showing construction of the floating power supply of the present invention in greater detail.

FIG. 3 is a cross-sectional view taken along the line 3-3 of FIG. 2, showing construction of the power supply 10 of the present invention in greater detail. As can be seen, the solar cells 18a, 18c, and 22 are mounted in corresponding recesses formed in the walls 16a, 16c, and 20. The solar cells 18b and 18d (not shown in FIG. 3) are also mounted in corresponding recesses formed in the walls 16b and 16d. The solar cells 18a-18d and 22 are waterproof, so as to withstand exposure to pool/spa water, as well as rain, without sustaining damage. The solar cells 18a-18d and 22 are connected via wires 46a, 46c and 48 to a printed circuit board 40 attached to a bottom wall 30 of the housing 12. Similarly, antenna 26 could be mounted to the top surface 20 to facilitate the transmission of radio frequencies to the floating power supply 10 and underwater cleaner. The antenna 26 is connected directly to the underwater device (e.g., cleaner) via cord 26a extending through grommet 44. In an alternative embodiment, the antenna 26 is connected to printed circuit board 40 by cord 26b (e.g., to allow for wireless communications with the printed circuit board 40). The printed circuit board 40 includes circuitry, discussed below, for delivering power to pool/spa equipment and for charging an optional on-board battery 38 connected to the printed circuit board 40 via cable 42. Such a battery 38, if provided, could be housed within a battery compartment 36 formed in the housing 12 and having a removable, waterproof door 32 (and associated handle 34). The door 32 could be removable from the housing 12, or pivotally connected thereto by way of a hinge. Advantageously, the battery 38 could provide power to pool/spa equipment when the power supply 10 is not exposed to sunlight, and the battery 38 could be charged by the solar cells 18a-18d and 22 when the power supply 10 is exposed to sunlight. This allows the power supply 10 to continue to deliver power to pool/spa equipment in periods of low or no sunlight. The printed circuit board 40 is also connected to the power cord 24a, for connection to pool/spa equipment. The grommet 44 ensures that a watertight seal is formed between the power cord 24a, the cord 26a, and the housing 12.

The peripheral floats 14a, 14c include inner chambers 28a, 28c which are filled with air. The floats 14b, 14d (not shown in FIG. 3) also include similar air-filled inner chambers. It is noted that the housing 12 could be constructed from a suitable, high-impact plastic material (e.g., ABS plastic), or any other equivalent. Preferably, such material is resistant to damage from ultraviolet light present in sunlight, and is lightweight. The floats 14a-14d could be formed integrally with the walls 16a-16d and 30. In alternate embodiments, the floats 14a-14d may be formed of a material that is inherently buoyant, such as plastic foams, e.g., polyvinyl chloride and polyethylene. Also, the entire housing 12 could be manufactured using any suitable manufacturing process, including, but not limited to, injection molding.

Figure 4:
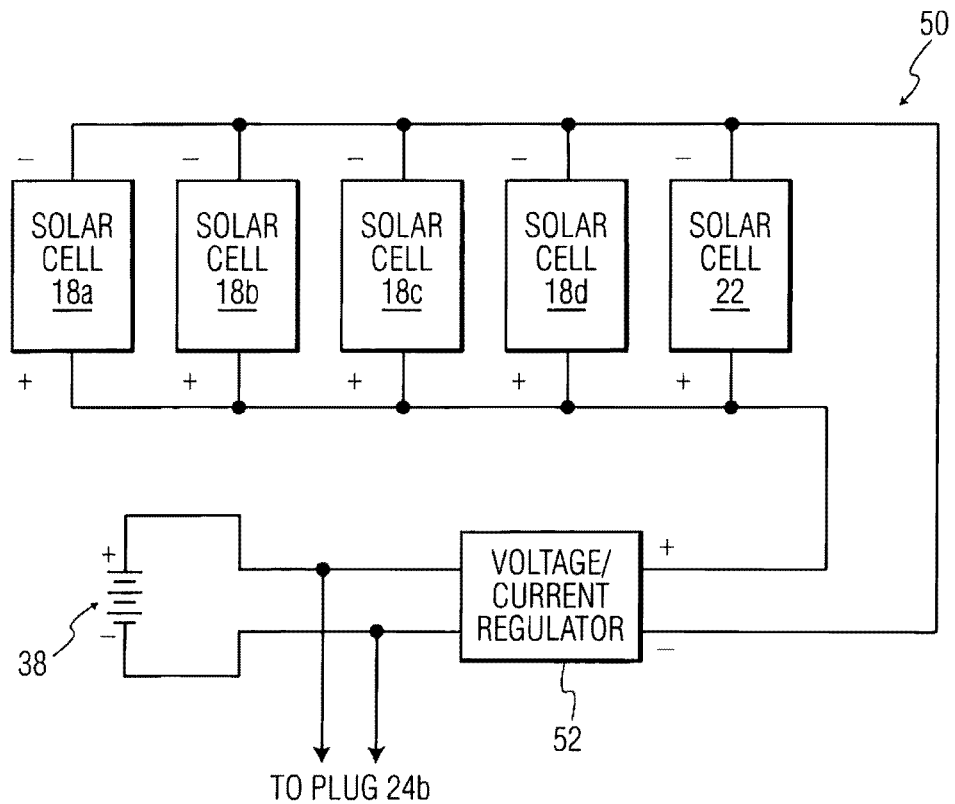
FIG. 4 is a schematic diagram showing circuitry of the floating power supply of the present invention.

FIG. 4 is a schematic diagram, indicated generally at 50, showing circuitry of the power supply 10 of the present invention. The solar cells 18*a*-18*d* and 22 are connected in parallel to a voltage or current regulator integrated circuit (IC) 52, which ensures proper delivery of electrical charge to the battery 38. The battery 38 could include a rechargeable nickel cadmium, nickel metal hydride, lithium ion, lithium polymer, sealed lead acid, or any other suitable rechargeable battery. Power from the battery 38, or from the solar cells 18*a*-18*d* and 22, is provided to pool/spa equipment connected to the coupling 24*b*.

Figure 5:
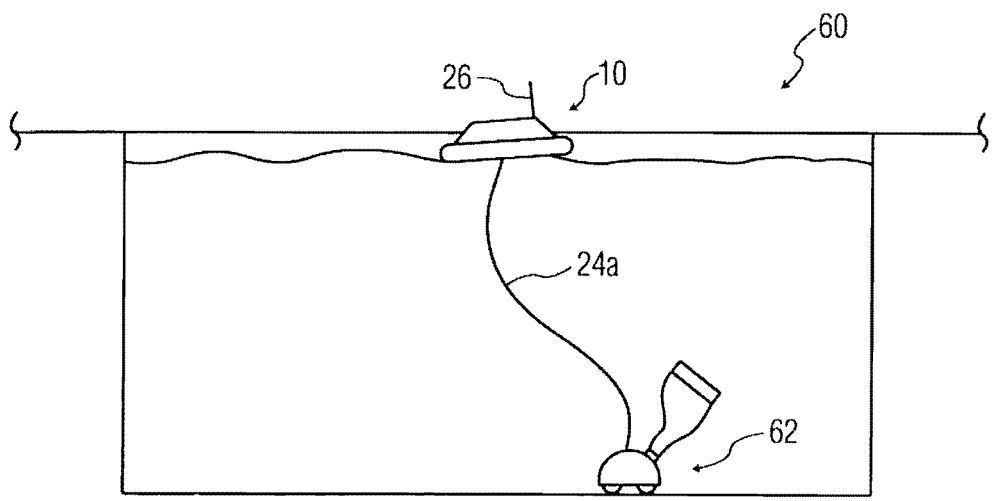
FIG. 5 is a diagram showing the floating power supply of the present invention, connected to an underwater electric pool cleaner.

FIG. 5 is a diagram showing the floating power supply 10 of the present invention, connected to an underwater electric pool cleaner 62. The power supply 10 provides electrical power to the underwater electric pool cleaner 62 via the power cable 24*a*, so that the cleaner 62 can be operated to clean a pool 60. Advantageously, since the power supply 10 floats within the pool 60 and can move with the pool cleaner 62 (being tethered to and "towed" by the pool cleaner 62 when it moves), there is no need to provide a power supply outside of the pool 60 for the pool cleaner or to drape a power cord outside of the pool 60. This reduces the risk that a person could trip on such objects near the side of the pool 60, and potentially fall into the pool 60. It is noted that the power supply 10 could be connected to other types of equipment, such as underwater decorative lighting, a decorative fountain, or other type of equipment, so as to provide electrical power to same. Also, it is noted that the pool cleaner 62 could include an onboard rechargeable battery, in which case the power supply 10 need not include such a battery and charges the rechargeable battery of the pool cleaner 62. The antenna 26 allows for remote, wireless command and control of the cleaner 62, e.g., by way of a handheld wireless remote control unit, a central pool/spa controller, a local area network, the Internet, etc.

It is noted that the floating power supply 10 can be easily disconnected from a pool cleaner by way of one or more plugs provided on the power cord 24*a* that connects the power supply 10 to the cleaner. This allows for easy removal and storage of the power supply 10.

Figure 6:
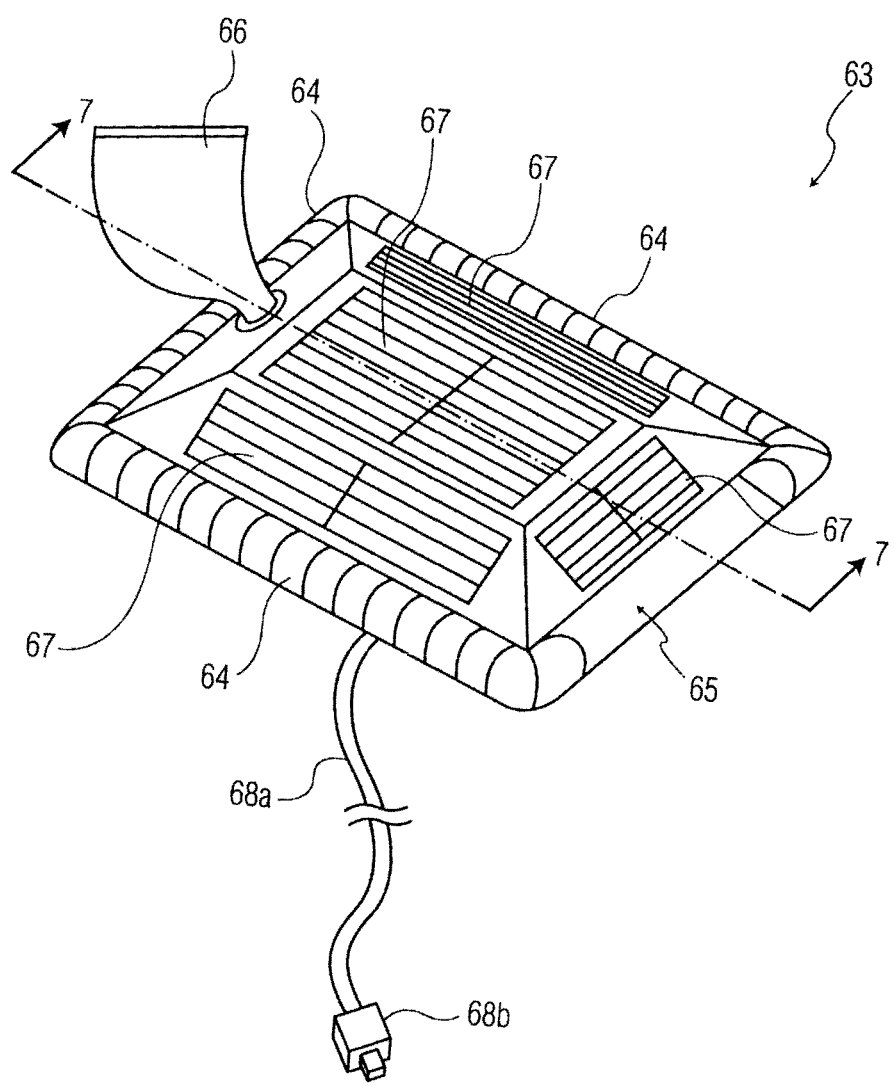
FIG. 6 is a perspective view of another embodiment of the floating power supply of the present invention which includes on-board surface skimming features.

FIG. 6 is a perspective view of another embodiment of the floating power supply of the present invention, indicated generally at 63. In this embodiment, the power supply 63 includes on-board surface skimming features that allow the power supply to clean ("skim") water in a pool or a spa, in addition to the power functions described above in connection with FIG. 1-5. Similar to the embodiment discussed above in connection with FIGS. 1-5, the power supply 63 includes a peripheral float 64 and a plurality of photovoltaic (solar) cells 67. A water inlet 65 is provided to allow for skimming of pool/spa water, and an internal pump and motor could be provided for powering skimming operations (discussed in greater detail below in connection with FIG. 7). An optional debris bag 66 could be provided for trapping skimmed surface debris, and could be removably coupled with the power supply 63 to permit easy removal of the bag to periodically clean same. Additionally, similar to the embodiments shown in FIGS. 1-5, a power cable 68*a* and associated plug 68*b* could be provided for connecting the power supply 63 to pool/spa equipment (e.g., a pool vacuum).

Figure 7:
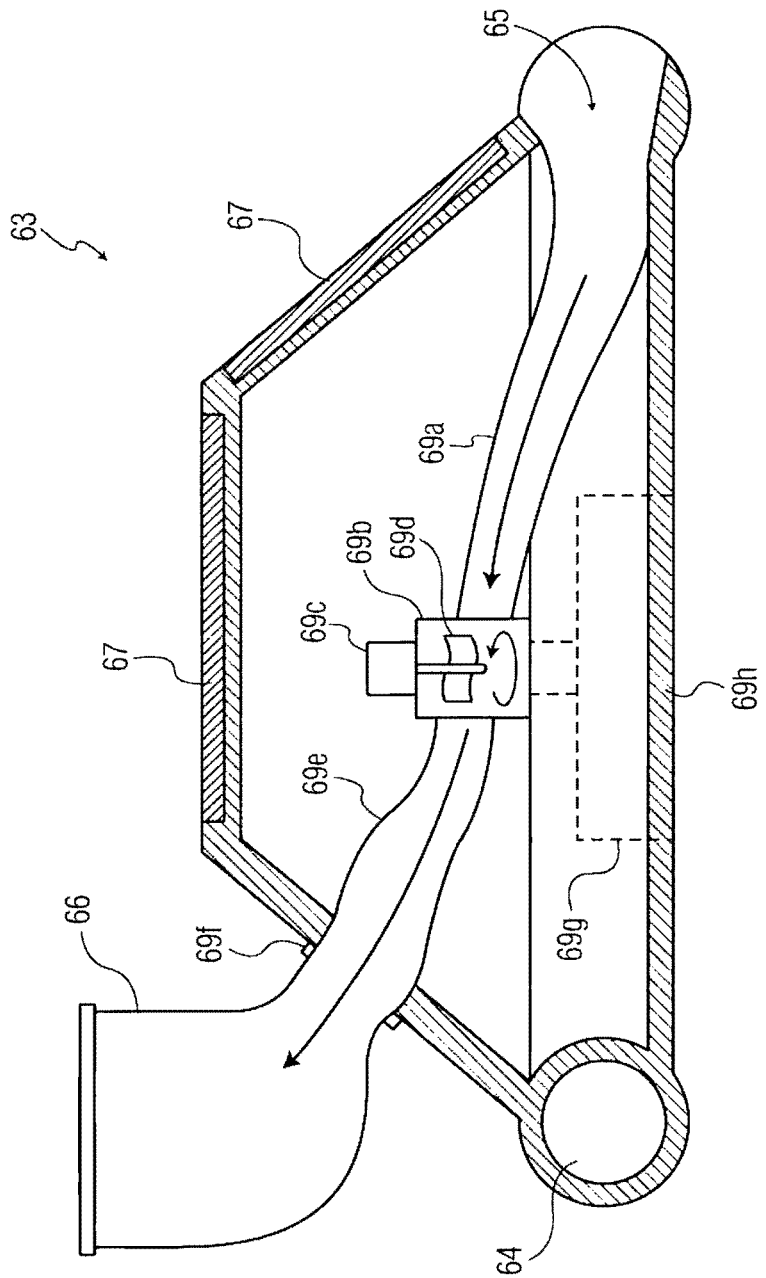
FIG. 7 is a partial cross-sectional view of the floating power supply shown in FIG. 6, taken along the line 7-7.

FIG. 7 is a partial sectional view of the power supply 63, taken along the line 7-7 of FIG. 6. As mentioned above, an on-board pump 69*b* could be provided to create suction for skimming operations, and for diverting skimmed surface debris into the debris bag 66. The pump 69*b* could include an electric motor 69*c* that powers an impeller 69*d*. The pump 69*b* could be connected to the water inlet 65 by a channel or flexible hose 69*a*, and could also be connected to a port 69*f* by a second channel or flexible hose 69*e*. The port 69*f* allows for removable coupling of the debris bag 66 to the power supply 63. Optionally, an on-board debris compartment 69*g* could be provided, thereby obviating the need for the bag 66. In such circumstances, the compartment 69*g* could be accessed by way of a door 69*h* provided on the power supply 63, to allow for periodic cleaning/emptying of the compartment 69*g*. It is noted that the motor 69*c* could be powered by the solar cells 67, and/or by an on-board battery provided in the power supply 63.

It also noted that the pump 69*b* and associated motor 69*c* need not be provided to perform skimming operations. For example, the water inlet 65 could be coupled directly to the debris bag 66 (e.g., by way of a channel or flexible hose). In such circumstances, if the power supply 63 is connected to a pool/spa vacuum via the cable 68*a*, it will be moved or "dragged" across the surface of the pool or spa as the vacuum moves. When this happens, debris if captured by the water inlet 65 and is channeled to the debris bag 66 by virtue of the physical movement of the power supply 63.

FIG. 8 is a diagram showing the power supply unit 72 of the present invention, connected to inductive power coupling couplings 80 installed in the walls of the pool 70. Of course, the couplings 80 could also be installed in the floor of the pool 70. The power supply unit 72 provides electrical power to the inductive power coupling couplings 80 via conduits 76*a*, 76*b*. The power supply conduit 76*a* connects to the power supply unit 72 and extends below ground 74. Below ground, the conduit 76*b* is positioned and connected to the inductive power coupling couplings 80, and, optionally, to a buried inductive power conduit and/or cable 76*c*. Inductive power coupling couplings 80 and inductive power conduit/cable 76*c* function allow for inductive transmission of electrical powered from the power supply 72 to an underwater device, such as an underwater pool/spa cleaner.

Figure 9A:
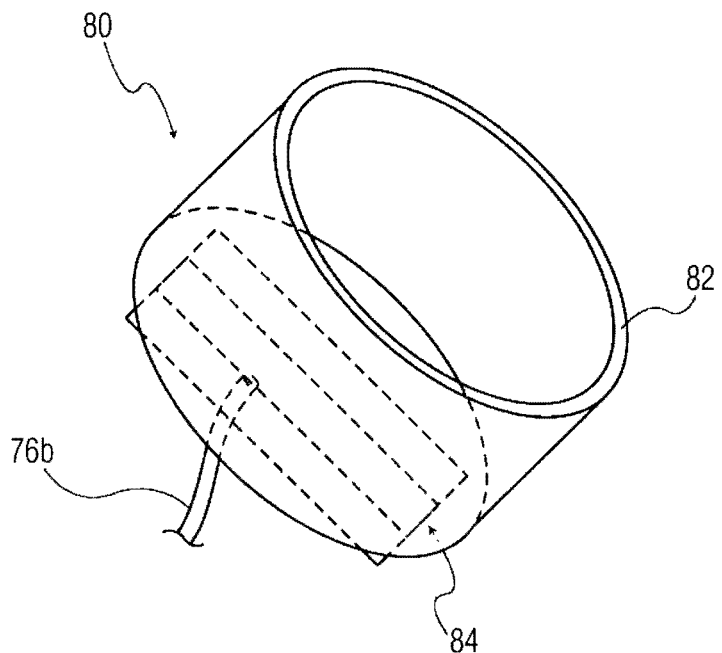
FIGS. 9A-9C are perspective, top, and side views, respectively, showing the inductive couplings of the present invention.
Figure 9B:
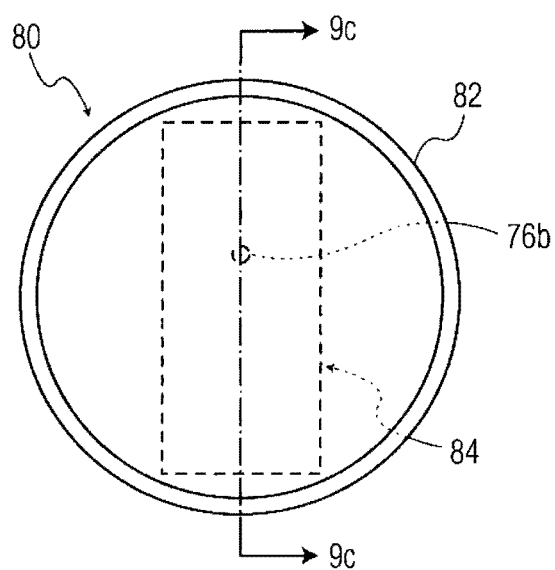
Figure 9C:
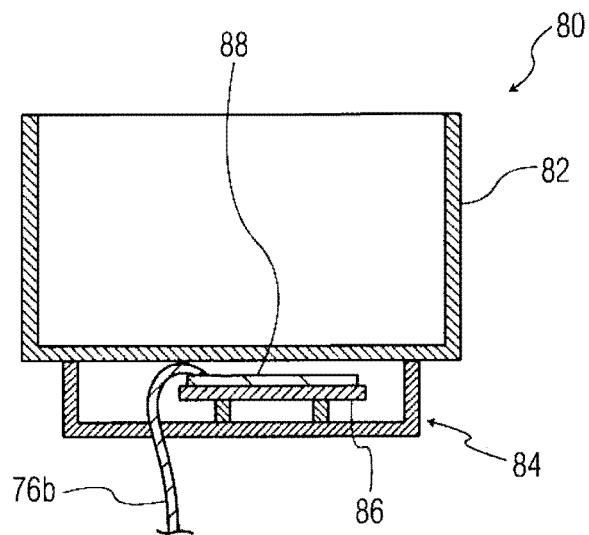

FIG. 9A-9C are perspective, top, and cross-sectional views, respectively, showing one embodiment of the inductive power coupling 80 of the present invention. The coupling 80 includes a housing 82 which is generally embedded in a pool or spa wall. The housing 82 defines a recess which receives a corresponding inductive power coupling from a pool or spa device, which will be described in greater detail below. The housing 82 could be made of a plastic material such as polyvinyl chloride (PVC) or any other sturdy waterproof material that does not interfere with electrical field transmission, and which is an electrical insulator. Of course, other materials could be utilized. Attached to the external surface of the rear wall of the housing 82 is circuitry housing 84. The circuitry housing 84 houses an inductor circuit 88 which allows for the inductive transmission of electrical power electrical power. The housing 82 defines a cavity allowing for the insertion of a complementary inductive coupler. Attached to the rear of the housing wall 82 is the circuitry housing 84. Enclosed within the circuitry housing 84 is a circuit board 86 which includes the inductor circuit 88. Providing power to the inductor circuit 88 is the power conduit 76*b*.

Figure 10A:
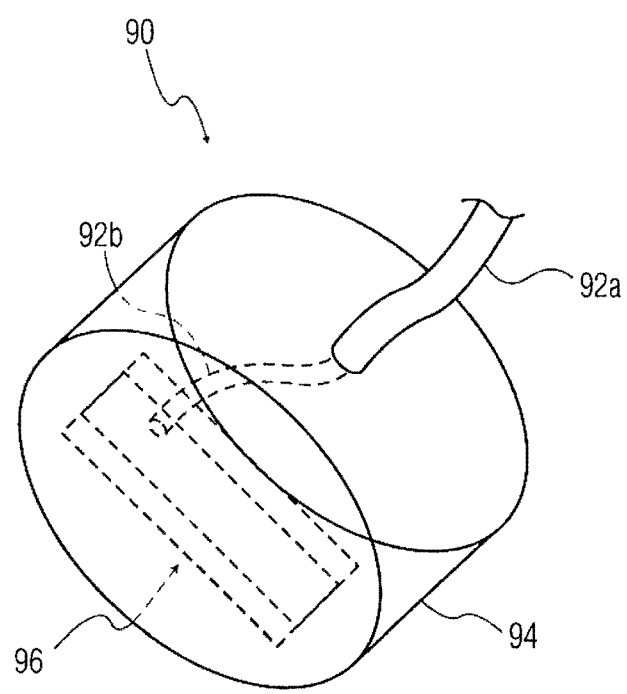
FIGS. 10A-10C are perspective, top, and cross-sectional views, respectively, of the complementary inductive couplings of the present invention.
Figure 10B:
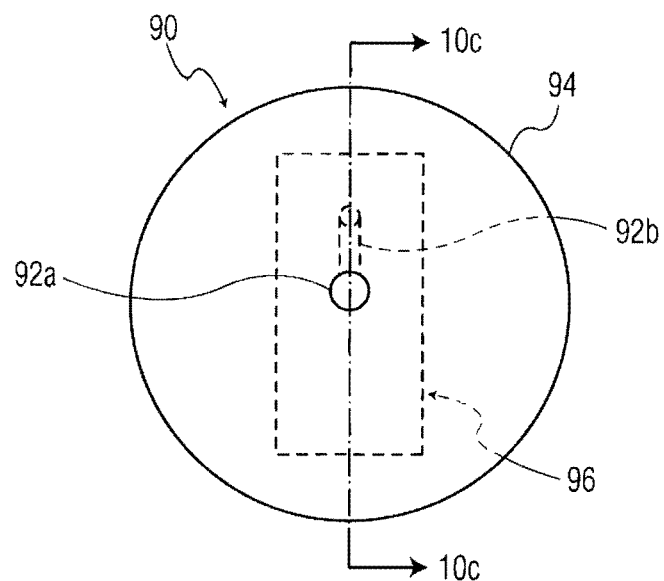
Figure 10C:
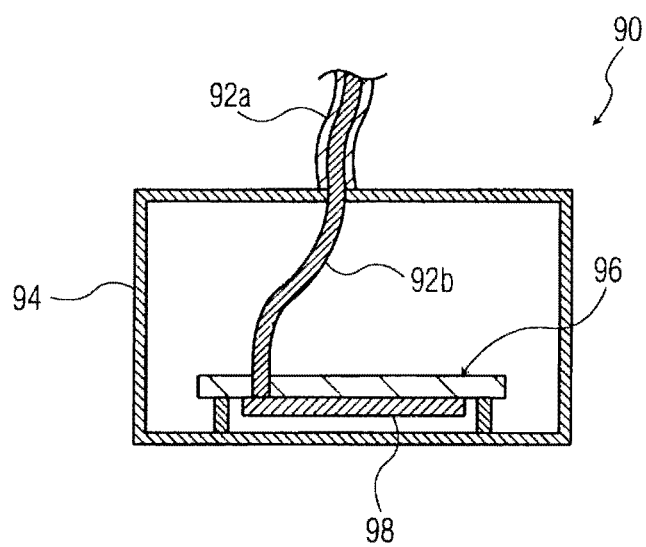

FIGS. 10A-10C are perspective, top, and cross-sectional views, respectively, of the complementary inductive coupler 90 of the present invention. The coupling 90 includes a housing 94 which is tethered to a pool or spa device such as a cleaner. The housing 94 could be made of a plastic material such as polyvinyl chloride (PVC) or any other sturdy, waterproof material that does not interfere with inductive power transmission. Attached to the inner surface of the front wall of the housing 94 is the circuitry housing 96. The circuitry housing 96 houses the inductor circuit 98 and allows for the power conduit 92b to supply the inductor circuit 98 with electrical power. Power cable 92b runs from the pool or spa apparatus, for example pool cleaner, to the inductor circuit 98. The cable 92b could be encased in a waterproof sheath 92a.

Figure 11A:
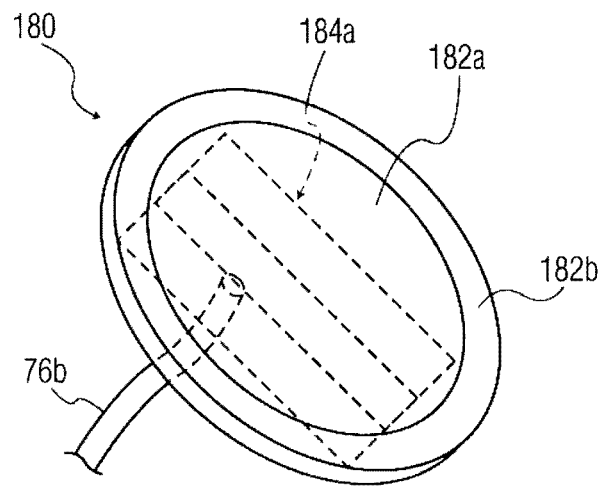
FIGS. 11A-11C are perspective, top, and cross-sectional views, respectively, of another embodiment of the inductive couplings of the present invention.
Figure 11B:
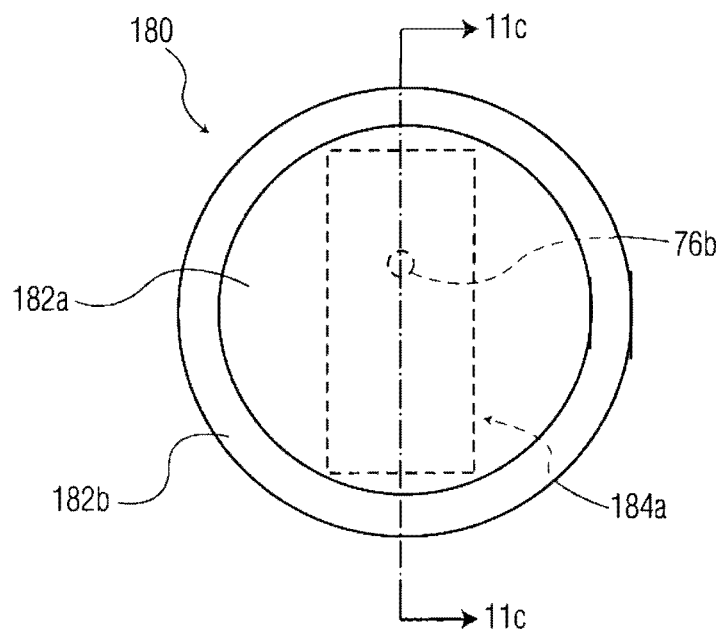
Figure 11C:
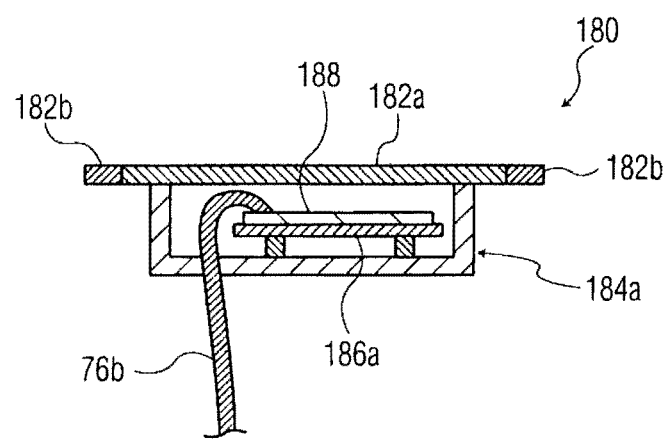

FIG. 11A-11C are perspective, top, and cross-sectional views, respectively, of another embodiment of the inductive coupling of the present invention, indicated at 180, wherein a flat coupling is provided. The coupling 180 comprises a flat plate 182a formed of a plastic material such as polyvinyl chloride (PVC) or any other sturdy waterproof material that does not interfere with inductive power transmission. Surrounding the periphery of the plate 182a is a magnetic ring 182b. Optionally, the ring 182b may be formed of a ferromagnetic metal. When installed, the plate 182a and magnetic ring 182b are generally bonded to a pool wall or positioned within a pool wall. Attached to the rear surface of the plate 182a is the circuitry housing 184a. The circuitry housing 184a houses the inductor circuit 188 and allows for the power conduit 76b to supply the inductor circuit 188 with electrical power. Enclosed within the circuitry housing 184a is a mounting board 186a which is attached to the inner surface of the circuitry housing 184a rear wall.

Figure 12A:
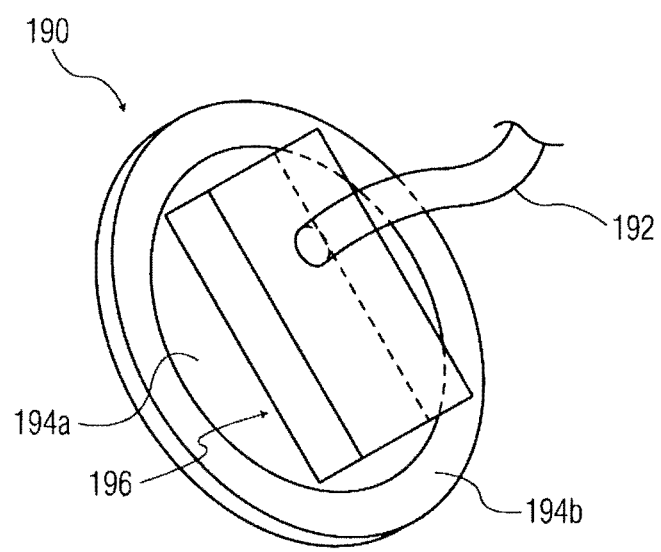
FIG. 12A-12C are perspective and top views, respectively, of another embodiment of the complementary inductive power couplings of the present invention.
Figure 12B:
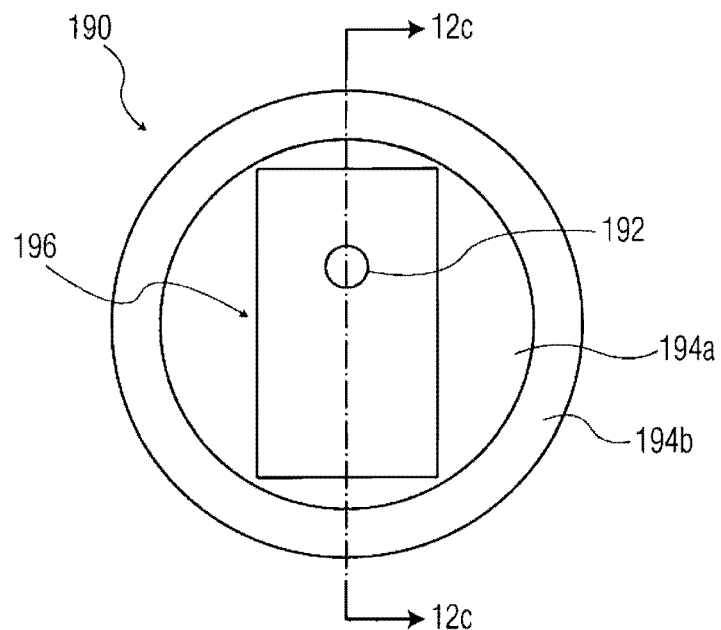
Figure 12C:
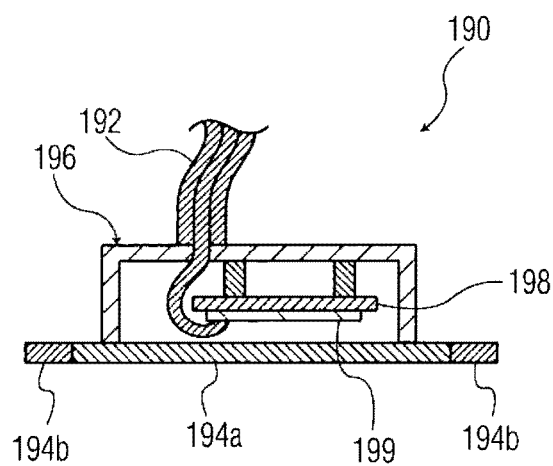

FIGS. 12A-12C are perspective, top, and cross-sectional views, respectively, of another embodiment of the complementary inductive coupling of the present invention, indicated generally at 190. The complementary coupling 190 is tethered to underwater pool/spa equipment, and mates with the coupling 180 of FIGS. 11A-11C. The coupling 190a includes a flat plate 194a formed of a plastic material such as polyvinyl chloride (PVC) or any other sturdy waterproof material that does not interfere with inductive power transmission. Surrounding the periphery of the plate 194a is a ferromagnetic metal ring 194b. Optionally, the ring 194b may be formed of a magnet. Attached to the rear surface of the plate 194a is the circuitry housing 196, which houses the inductor circuit 199 which is connected to a power cable 192 connected to underwater pool/spa equipment. The circuit 199 could be mounted to a mounting board 198, as shown.

Figure 13A:
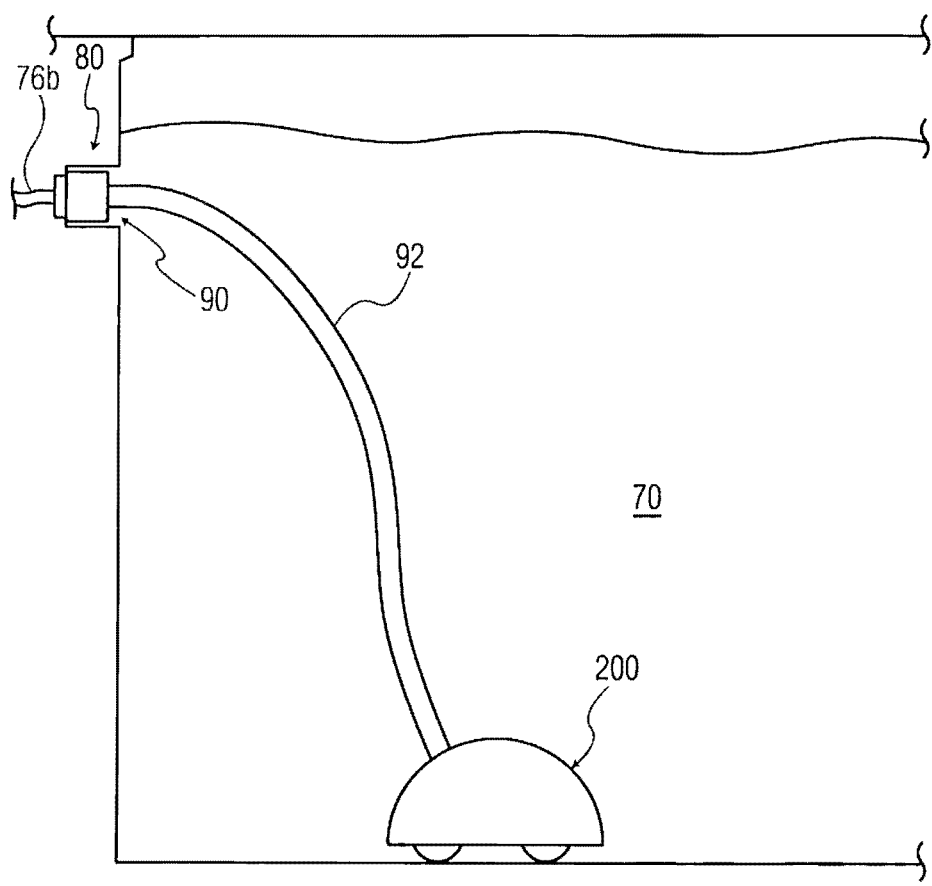
FIGS. 13A-13B are side views of the present invention showing mating of the inductive power couplers.
Figure 13B:
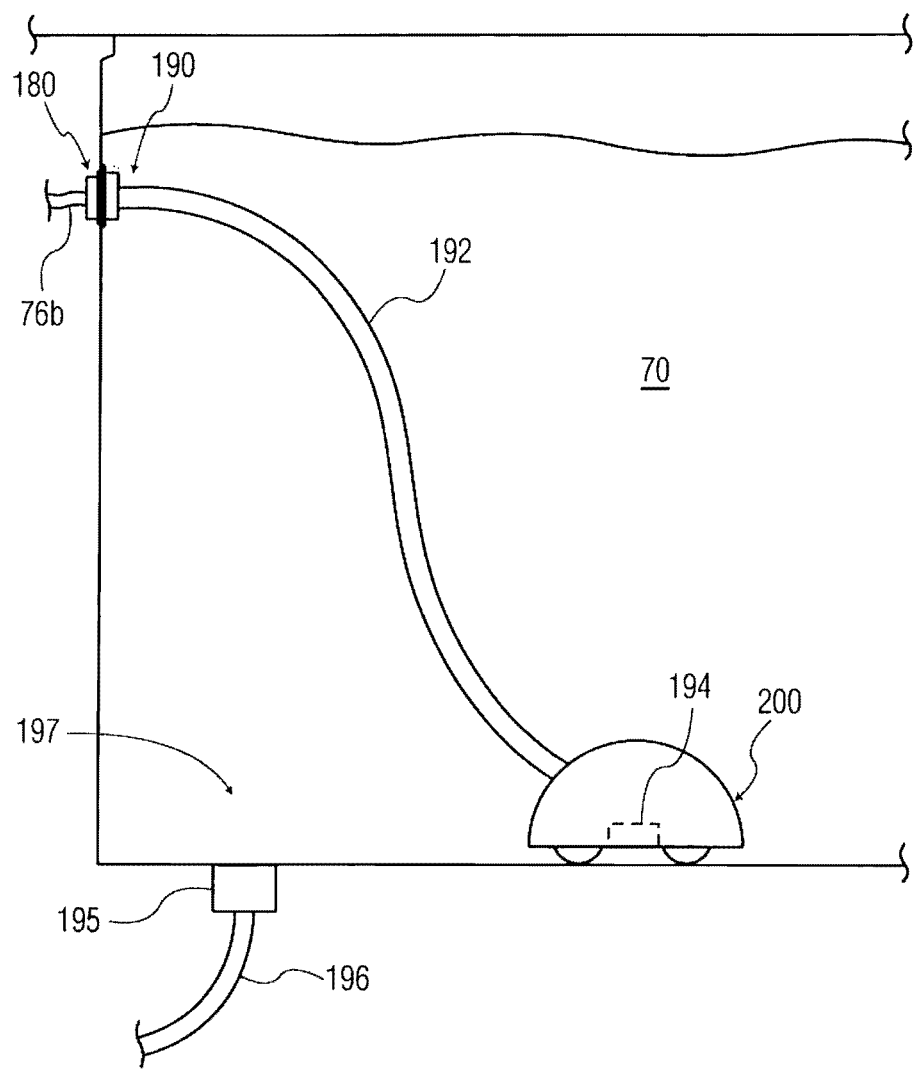

FIGS. 13A-13B are side views showing operation of the couplings 80, 90 and 180, 190, respectively. As can be seen, the couplings allow an underwater pool/spa device, such as an underwater electric pool/spa cleaner 200, to be removably connected to a power source. Advantageously, the couplings 80, 90 and 180, 190 allow for quick connection and disconnection, and due to their insulated nature, the risk of electric shock is obviated. Moreover, since the couplings have smooth surfaces, they are easy to clean.

Referring to FIG. 13B, it is noted that a docking area or "station" 197 could be provided in a pool or spa, to which area or station the pool/spa cleaner 200 automatically travels and docks to periodically recharge the on-board battery of the pool/spa cleaner. In such circumstances, the cable 192 need not be provided. Instead, an inductive coupling 195 is embedded in a surface of the pool or spa (e.g., in the floor of the pool as shown in FIG. 13b), and a corresponding inductive circuit 194 is provided on-board the cleaner 200. A power cable 196 provides electrical energy to the coupling 195. When the cleaner 200 detects a low battery condition (e.g., by way of built-in monitoring circuitry and/or logic), the cleaner 200 automatically navigates to the docking area 197, such that the inductive circuit 194 is positioned above the coupling 195 and electrical power is inductively transmitted from the coupling 195 to the circuit 194, and the battery is charged by such power. It is also noted that a recess could be provided in the wall of the pool or spa, the inductive coupler 195 could be positioned within the recess, and the cleaner 200 could navigate to and park itself in the recess to perform periodic charging operations.

Figure 14:
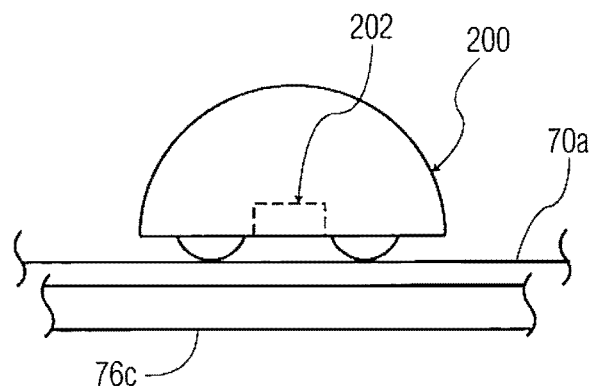
FIG. 14 is a side view showing the an underwater device being powered by the buried inductive power conduit or cable of the present invention.

FIG. 14 is a side view showing the pool cleaner 200 of FIGS. 13A-13B, wherein the pool cleaner 200 includes an on-board inductive circuit 202 which allows for inductive transmission of power from the buried inductive element 76c, e.g., conduit/cable, to the cleaner 200. As the cleaner 200 travels along the floor 70a of the pool, the inductive element 76 transmits electrical power to the circuit 202, to power the cleaner 200.

Figure 15:
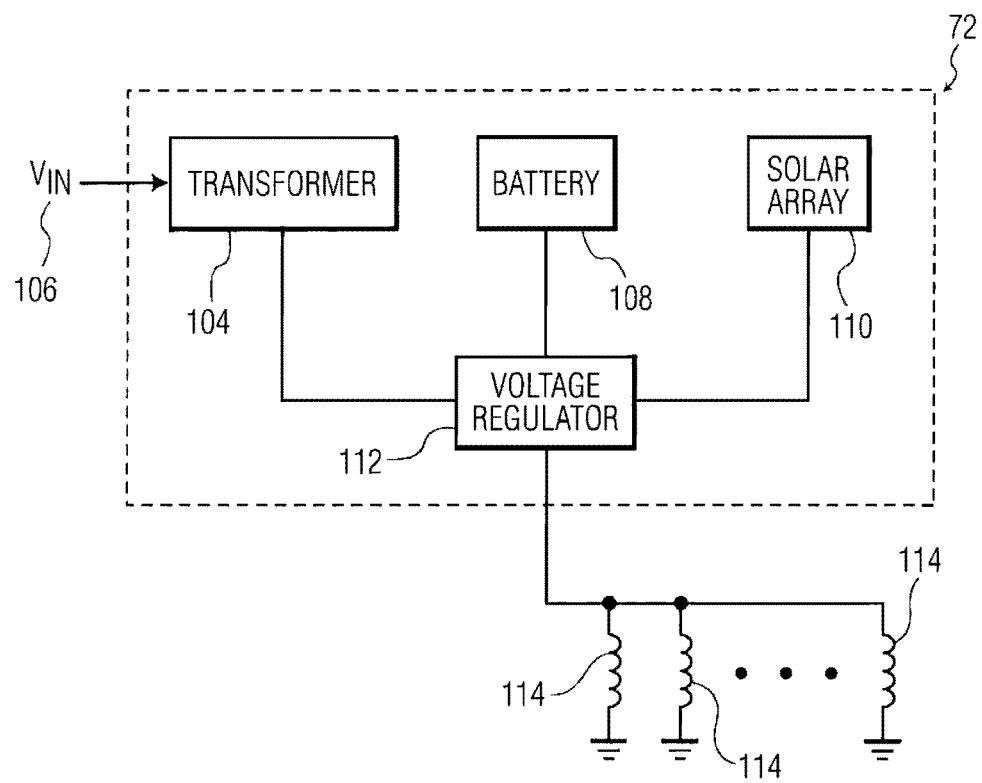
FIG. 15 is an electrical schematic diagram showing circuitry of the power supply unit of the present invention.

FIG. 15 is an electrical schematic diagram showing the power supply 72 in greater detail. The power supply 72 could step down an input voltage 106 via transformer 104 to provide power to inductors 114 (which could be positioned within the couplings 80, 90). Optionally, the transformer 104 could be a step-down transformer (e.g., 120 VAC to 12 VAC), and/or it could be an isolation transformer. Further, the power supply 72 could include a voltage regulator 112 for regulating voltage supplied to the inductors 114. Still further, the power supply 72 could be powered by an internal battery 108 (e.g., rechargeable nickel cadmium, nickel metal hydride, lithium ion, lithium polymer battery, etc.), and/or via a solar array 110, either (or both) of which could be connected to the inductors 114 via voltage regulator 112. The solar array 110 could charge the battery 108 in periods of sunlight.

Figure 16:
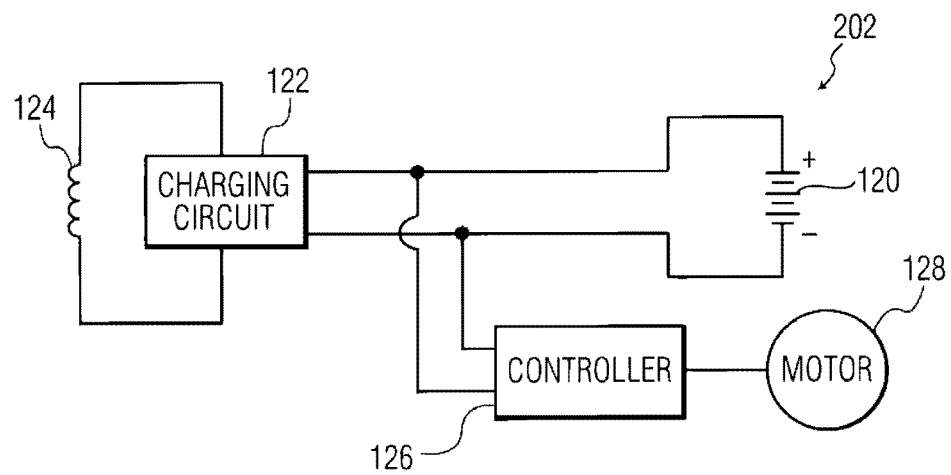
FIG. 16 is an electrical schematic diagram showing circuitry of an underwater pool cleaner which includes an inductive coupling in accordance with the present invention.

FIG. 16 is an electrical schematic diagram showing the inductive circuit 202 of the pool cleaner 200 in greater detail, for obtaining power from the buried conduit/cable 76c. An inductor 124 wirelessly receives power from the conduit/cable 76c, which could supply power to an optional charging circuit 122 for charging an on-board battery 120 of the cleaner 200. The inductor 124 could also power a controller 126 and a motor 128 of the cleaner 200. When the cleaner is not being used, it could be "parked" in proximity to the buried cable/conduit 76c, so that the inductor 124 wirelessly receives power from the cable/conduit 76c and charges the battery 120. When the battery 120 is charged, the cleaner 200 could operate at any location within the pool. Also, the controller 126 could include embedded logic which automatically detects when the battery 120 is low, and automatically navigates the cleaner 200 toward the conduit/cable 76c so that power is inductively obtained from the conduit/cable 76c to charge the battery 120.

Figure 17:
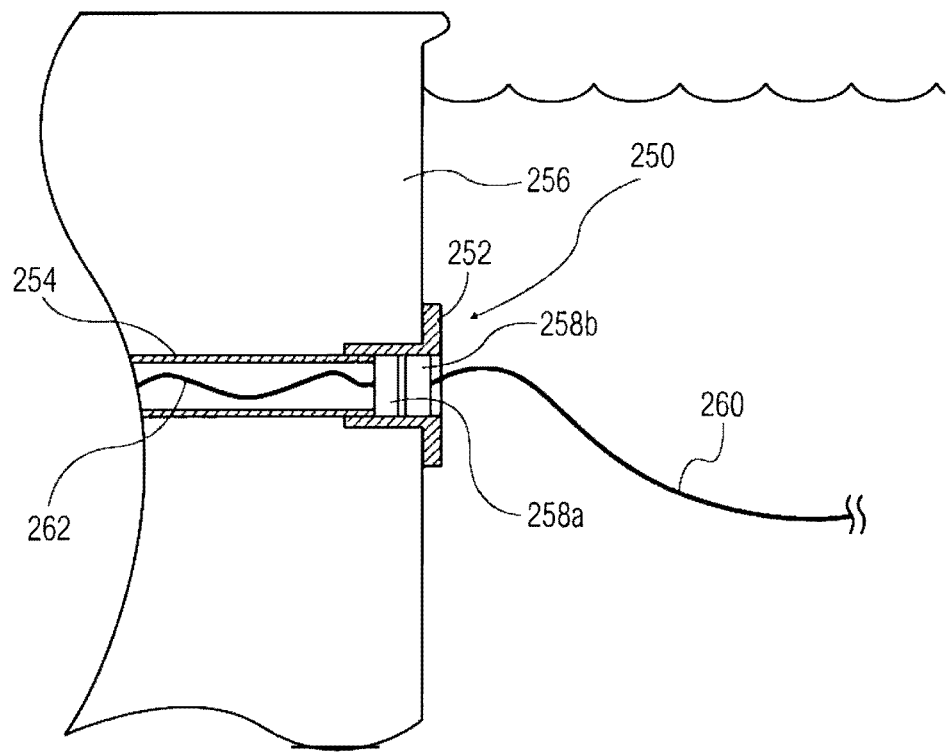
FIG. 17 is a partial sectional view of another embodiment of the present invention, showing an inductive power coupling provided in an existing plumbing fixture.

FIG. 17 is a partial sectional view of another embodiment of the present invention, indicated generally at 250, wherein inductive power couplings are provided in an existing plumbing fixture, e.g., suction port 252 and pipe 254, in a pool or spa 256. This arrangement is particularly advantageous as a "retrofit" solution for existing pools or spas. Conventional operation of the suction port 252 and pipe 254 can be disabled, and the port 252 and pipe 254 are instead used to deliver electrical power. As shown in FIG. 17, a first inductive coupling 258a is mounted within the suction port 252, and an electrical cable 262 is "pulled" through the pipe 254 and subsequently connected (e.g., at an equipment pad) to a power supply circuit (e.g., that steps power down from 120 volts A.C. to 12 volts A.C.). The coupling 258a could be retained in place by way of a friction fit, a snap fit, gluing, etc., or in any other suitable fashion. A corresponding inductive coupling 258b is sized and shaped to be removably received by the port 252, and electrical power is inductively transmitted from the coupling 258a to the coupling 258b when the coupling 258b is positioned within the port 252. A cable 260 connects the coupling 258b to pool/spa equipment (e.g., to a pool cleaner), and transfers electrical power to same. It is noted that the arrangement shown in FIG. 17 could also be applied to other types of outlets existing in a pool or spa, and operation of such outlets (including the suction port 252 and pipe 254) may be active and need not be disabled. In other words, the inductive couplings could be positioned within such outlets but need not form a seal, so that water can still flow around the couplings, thereby permitting normal operation of such outlets.

It is noted that the inductive power couplings discussed herein could be utilized to provide power to pool/spa equipment not only for powering operation of these devices, but also to charge any on-board batteries that may be provided in such devices. Further, the inductive power couplings could be configured so as to change voltage levels. For example, an inductive coupling embedded in a wall of a pool or a spa could receive electricity at a first voltage (e.g., 120 volts A.C.), and a corresponding coupling could deliver power to a device in a pool or a spa at a different voltage level (e.g., 12 volts A.C.). This could be achieved by different numbers of wire "turns" provided in the couplings, such that the two couplings, when positioned near each other, function as an electrical transformer.

Figure 18A:
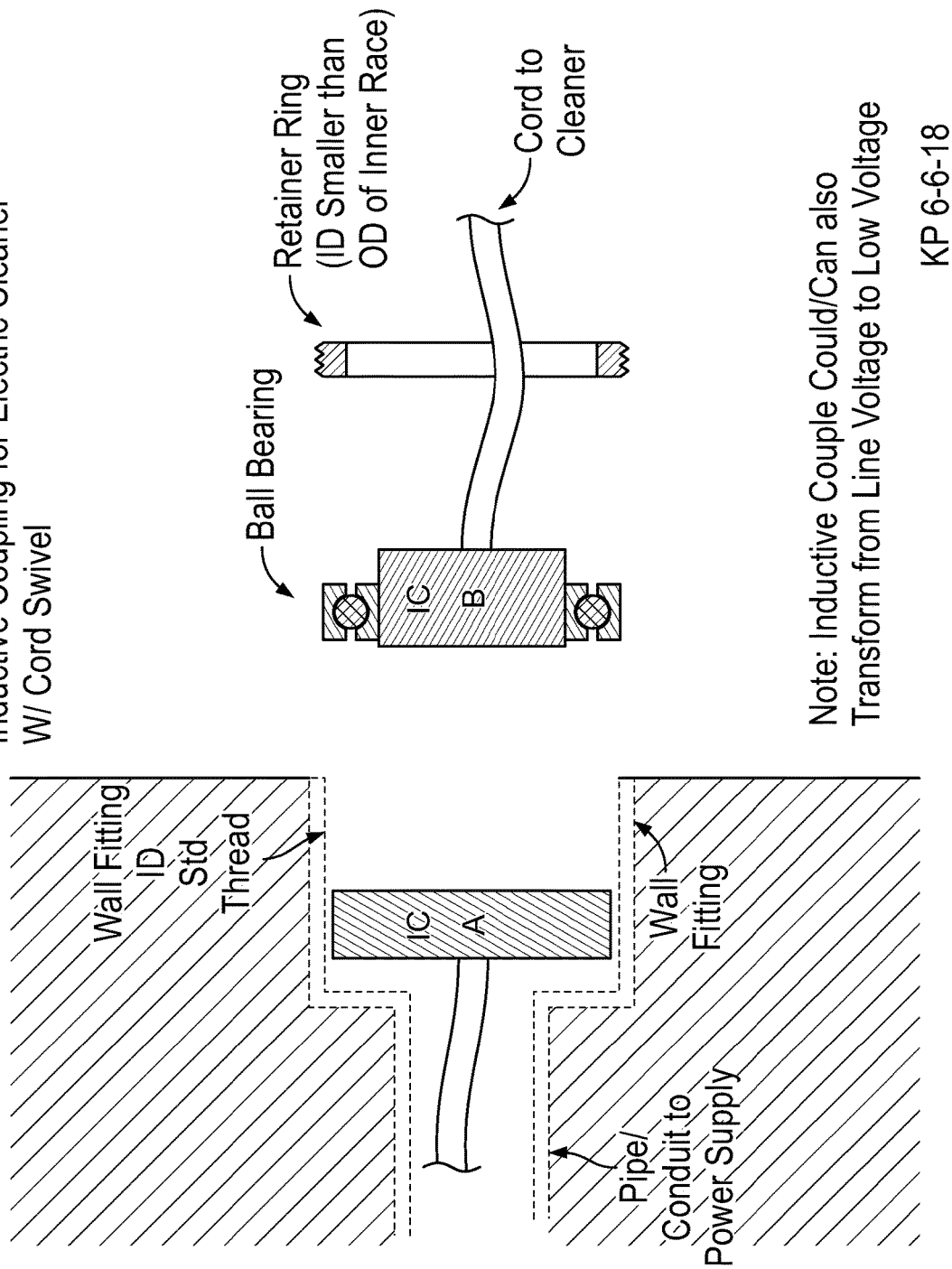
FIGS. 18A-18B are sectional views of another embodiment of the inductive power couplings of the present invention, including a second power coupling that is inductively coupled with a first power coupling and can swivel with respect to the first power coupling to reduce kinking, tangling, and/or bunching of a power cable of a pool or spa device.
Figure 18B:
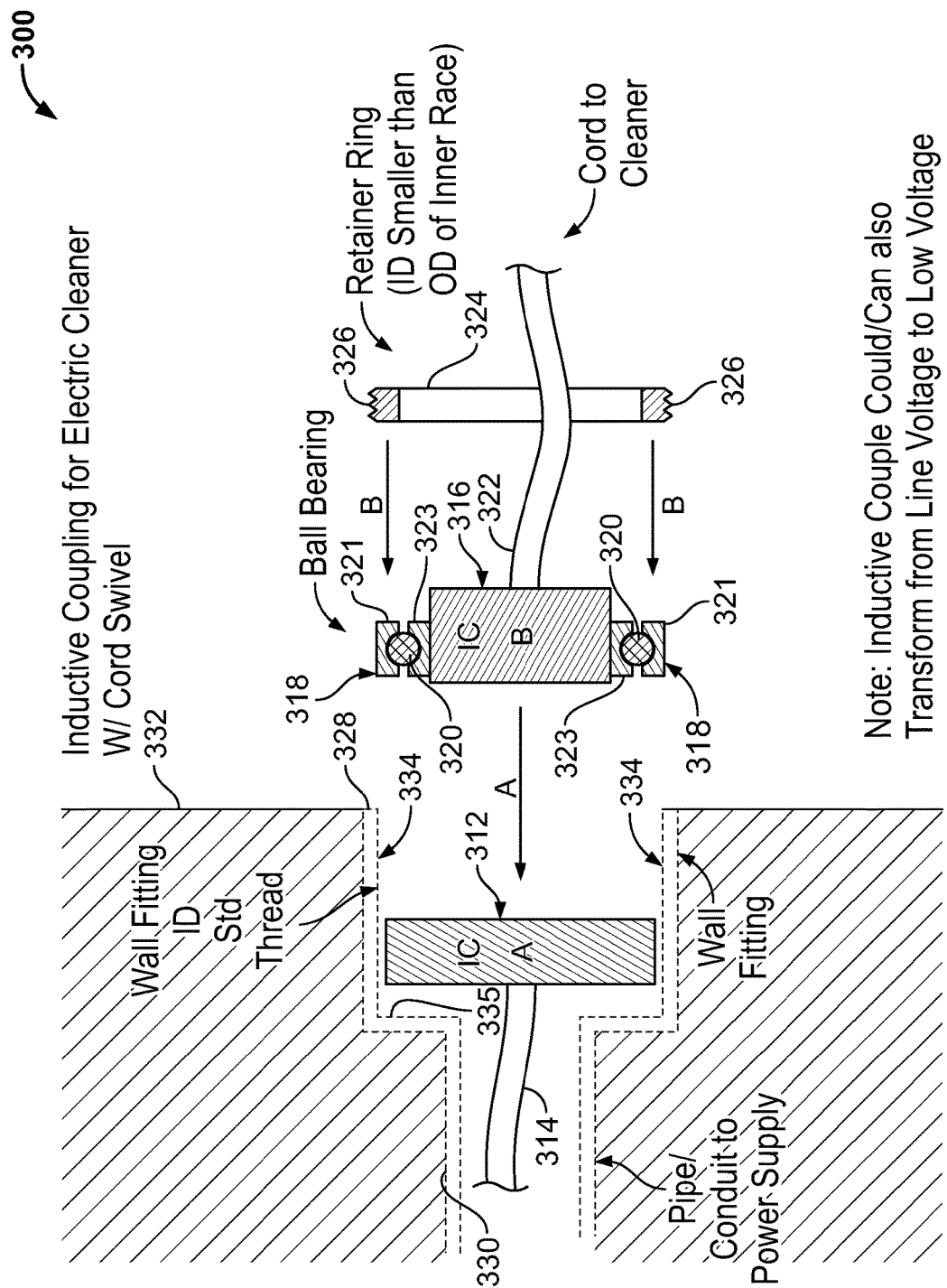

FIGS. 18A-18B are sectional view of another embodiment of the inductive power couplings of the present invention, wherein a cord swivel feature is provided. FIG. 18A is an original inventor sketch of this embodiment, with the figure number ("FIG. 18A") added to the sketch, and FIG. 18B is the same sketch with reference numerals and indicia added for further clarification and discussion herein. Referring to FIG. 18B, the inductive power couplings, indicated generally at 300, include a swivel feature that allows a power cord to a pool or spa component, such as an electric pool cleaner, to swivel when the inductive power couplings are coupled together. The couplings 300 include a first inductive coupling 312 that can be positioned within and/or mounted into a wall fitting 328 in the wall 332 of a pool or spa, a second inductive coupling 316 that inductively couples with the first inductive coupling 312, a swivel component 318 attached to the second inductive coupling 316 for allowing the second coupling 318 to swivel with respect to the first inductive coupling 312, and a retainer ring 326 that engages with the wall fitting 328 and retains the first and second couplings 312, 316 and the swivel component 318 in position within the wall fitting 328. A power cord 322 is connected at one end to the second inductive power coupling 316 and at an opposite end to a pool or spa component, such as an electric cleaner. Swiveling of the second power coupling 316 relative to the first power coupling 312 reduces kinking, tangling and/or bunching of the power cord when the electric cleaner is in operation.

The first inductive coupling 312 can be positioned within the wall fitting 328, and a power cord 314, which supplies electrical power to the coupling 312, can extend through a pipe or conduit 330 for connection at an opposite end of the power cord 314 to a power supply. The second power coupling 316 and the swivel component 318 can be positioned against the first power coupling (in the direction indicated by arrow A) and retained in position within the wall fitting 334, so that the couplings are inductively coupled to each other and allow for electricity to be transferred from the first coupling 312 to the second coupling 316. The swivel component 318 is attached along its inner diameter to the second power coupling 316, and along its outer diameter to an inner wall 334 of the wall fitting 328. Such attachment could be by way of a threaded connection, friction fit, adhesives, etc. Preferably, a friction fit is provided such that outer wall of the swivel component 318 fits snugly against the inner wall 334 during use, yet is removable by a pool/spa owner if desired. Ball bearings 320 permit both an inner ring 323 and the power coupling 316 to rotate with respect to an outer ring 321 of the swivel component 318 (which is attached to the inner wall 334 of the wall fitting 328). Such motion allows the second power coupling 316 and the cord 322 to swivel with respect to the first power coupling 312, thereby preventing kinking, tangling, and/or bunching of the power cord 322 when the electric cleaner is in operation. The retainer ring 324 is positioned against the swivel component 318 (in the direction indicated by the arrows B), and could include a threaded outer diameter 326 that attaches to matching threads formed on the inner surface 334 of the wall fitting 328, so as to retain the couplings 312, 316 and the swivel component 318 within the wall fitting 328 when the retainer ring 326 is threaded into the wall fitting 328. This permits easy installation and removal of the couplings, swivel component, and retainer ring by a pool/spa owner, installer, servicer, etc.

The wall fitting 328 can also include a rear shoulder 335 extending between the inner wall 334 and the pipe or conduit 330. The rear shoulder 335 can include an inner diameter, e.g., where it connects to the pipe or conduit 330, that is smaller than an outer diameter of the first inductive coupling 312. This configuration prevents the first inductive coupling 312 from receding too far into the pipe or conduit 330. Additionally and/or alternatively, the first inductive coupling 312 can secure itself to the inner diameter of the inner wall 334 and/or the pipe or conduit 330 to prevent the first inductive coupling 312 from receding too far into the pipe or conduit 330.

It is noted that the power couplings 312, 316 can transform line voltage from one voltage to another voltage (e.g., low voltage to high voltage, or vice versa), if desired, thus functioning as a step-up or step-down transformer. Additionally, the couplings 312, 316 could function as an isolation transformer to provide electrical safety. Still further, the couplings 312, 316 could be magnetically coupled to each other, if desired, yet still allow for swiveling of the couplings.

It is also noted that the couplings 300 need not be limited to installation within a wall fitting of a pool or spa wall, and indeed, the couplings 300 could be positioned at other locations if desired. Even further, inductive power transfer and swivel features of the couplings 300 could be incorporated into one or more cable swivels provided in pool/spa power cables, if desired. One example of such cable swivels is disclosed in U.S. Pat. No. 9,300,101, the entire disclosure of which is expressly incorporated herein by reference in its entirety. As disclosed therein, one or more cable swivels are provided between pool cleaner power cables, and allow for swiveling of the power cables while permitting transfer of power between the cables. The cable swivels disclosed in the '101 patent could be modified to include the inductive couplings 312, 316 and the swivel mechanism 318 discussed in connection with FIGS. 18A-18B, to allow for inductive power transfer and swiveling of power cables coupled together by the cable swivels.

Having thus described the invention in detail, it is to be understood that the foregoing description is not intended to limit the spirit or scope thereof.

What is claimed is:

1. In an inductive power coupling for powering a pool or spa component, the inductive power coupling having a first inductive coupling connected to a first power cable and a second inductive coupling connected to a second power cable and inductively coupled to the first inductive coupling, the first inductive coupling inductively transferring electricity to the second inductive coupling, the improvement comprising:
  a swivel component allowing said second inductive coupling and said second power cable to swivel with respect to said first inductive coupling and a retainer ring configured to be removably secured within an opening in a wall of a pool or spa and including a surface facing a lateral face of the swivel component, the retainer ring retaining the first and second couplings and the swivel component in position within the wall of the pool or spa, wherein the swivel component includes: (i) an inner component having an inner surface and an outer surface, the inner surface of the inner component attached concentrically about a cylindrical outer surface of a housing of the second inductive coupling, and (ii) an outer component having an inner surface and an outer surface, the outer surface of the outer component attached to an inner surface of a wall fitting of the pool or spa, the outer component of the swivel component positioned concentrically about the inner component of the swivel component and the inner component of the swivel component positioned concentrically about the second inductive coupling, the outer component of the swivel component rotating with respect to the inner component of the swivel component to permit the second inductive coupling to swivel with respect to the first inductive coupling.

2. The coupling of claim 1, wherein the first inductive coupling is positionable within the wall fitting.

3. The coupling of claim 2, wherein said retainer ring is engageable with the wall fitting to retain said first inductive coupling, said second inductive coupling, and said swivel component within the wall fitting.

4. The coupling of claim 3, wherein the retainer ring is threaded into the wall fitting.

5. The coupling of claim 2, wherein the wall fitting includes a rear shoulder having an inner diameter that is less than an outer diameter of the first inductive coupling, the rear shoulder preventing the first inductive coupling from receding into a pipe or conduit.

6. The coupling of claim 2, wherein the wall fitting includes an inner wall and the first inductive coupling is secured to the inner wall preventing the first inductive coupling from receding into a pipe or conduit.

7. The coupling of claim 2, further comprising a friction fit formed between an outer wall of the swivel component and an inner wall of the wall fitting.

8. The coupling of claim 1, wherein said swivel component further comprises a plurality of ball bearings positioned between said inner and outer components.

9. The coupling of claim 1, wherein said first inductive coupling and said second inductive coupling operate as a step-up or a step-down transformer.

10. The coupling of claim 1, wherein the first inductive coupling, the second inductive coupling, and the swivel component form part of a pool or spa power cable.

* * * * *